US012246529B2

(12) United States Patent
Van Der Asdonk et al.

(10) Patent No.: US 12,246,529 B2
(45) Date of Patent: Mar. 11, 2025

(54) PRINT METHOD WITH IMPROVED ADHESION OF PRINTS TO RECORDING MEDIUM

(71) Applicant: Canon Production Printing Holding B.V., Venlo (NL)

(72) Inventors: Pim Van Der Asdonk, Venlo (NL); Ke Peng, Venlo (NL); Clemens T. Weijkamp, Venlo (NL); Hendrik J. A. Ogrinc, Venlo (NL); Robin X. E. Willemse, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 178 days.

(21) Appl. No.: 18/092,663

(22) Filed: Jan. 3, 2023

(65) Prior Publication Data

US 2023/0226829 A1 Jul. 20, 2023

(30) Foreign Application Priority Data

Jan. 14, 2022 (EP) .................................... 22151513

(51) Int. Cl.
*B41J 11/00* (2006.01)

(52) U.S. Cl.
CPC ............................... *B41J 11/00214* (2021.01)

(58) Field of Classification Search
CPC ............ B41J 11/00214; B41J 11/0021; B41M 5/0011; B41M 7/0081; B41M 3/008
See application file for complete search history.

(56) References Cited

U.S. PATENT DOCUMENTS

2008/0081116 A1* 4/2008 Makuta .............. B41J 11/00214 427/372.2
2016/0221708 A1* 8/2016 Ojima .................. B41J 3/40733

FOREIGN PATENT DOCUMENTS

EP 3 461 649 A1 4/2019

OTHER PUBLICATIONS

European Search Report issued in Application No. 22 15 1513, dated Jun. 30, 2022.

* cited by examiner

*Primary Examiner* — Bradley W Thies
(74) *Attorney, Agent, or Firm* — Birch, Stewart, Kolasch & Birch, LLP

(57) ABSTRACT

A method for applying an image onto a recording medium includes applying a first layer of a radiation-curable ink onto a recording medium; curing the first layer; and applying at least a second layer of radiation-curable ink on top of the first cured layer. The coverage of the first layer is 1.0 g/m2 or less. The first layer of ink is applied onto the recording medium by applying a first ink from an ink set and the second layer is applied by applying at least the first ink from the ink set.

9 Claims, 2 Drawing Sheets

PRINT METHOD WITH IMPROVED ADHESION OF PRINTS TO RECORDING MEDIUM

The present invention relates to a print method. The present invention further relates to a software product. The present invention also relates to an inkjet printing apparatus.

BACKGROUND OF THE INVENTION

Methods for printing images using radiation-curable ink are well known in the art. In such methods, an image is formed by applying droplets of a radiation-curable ink onto a recording medium and curing the ink. Curing of such inks is typically done by irradiation the ink ejected onto the recording medium with a suitable type of radiation. UV radiation is most often used as radiation. Robust images may be formed using such methods. Many types of recording medium may be used, including paper, textile media, self-adhesive vinyl media and rigid media.

It is desired that the ink applied onto the recording medium adheres well to the recording medium. However, the adhesion of an ink may differ for different types of media; an ink composition may adhere well to certain types of media, but may not adhere well to other types of media. This problem can be solved by using different types of ink for different types of media. However, this solution has disadvantages, because it may require to switch ink between print jobs on different media. This is time consuming and also inefficient with respect to ink usage, as the print heads and ink supply of a printer may need to be flushed when switching ink.

It is therefore desired to be able to print images onto a variety of recording media and to have the ink adhering well onto different types of media, without the need of using different types of ink for different types of media.

It is therefore an object of the invention to provide a method for printing that enables to make prints having good adhesion onto a wide range of recording media. It is a further object of the invention to provide a printer that is able to make prints having good adhesion onto a wide range of recording media.

The object of the invention is achieved in a method for applying an image onto a recording medium, the method comprising the steps of:

a) applying a first layer of a radiation-curable ink onto a recording medium;
b) curing the first layer;
c) applying at least a second layer of radiation-curable ink on top of the first cured layer, wherein the coverage of the first layer is 1.0 g/m$^2$ or less.

The present invention relates to a print method. In a print method, a marking material such as an ink composition is applied onto a recording medium to provide the recording medium with an image. The recording medium may be any type of material suitable to be provided with an image using ink. The recording medium may be e.g. plain paper, machine coated paper, vinyl media including self-adhesive vinyl media, polyester textiles, canvas or rigids.

In the method according to the invention, in step a, a first layer of a radiation-curable ink is applied onto the recording medium. The radiation-curable ink may be applied onto the recording medium using a suitable ink applicator, such as a roller, a spray unit or an inkjet print head. The spray unit may spray small droplets of the ink composition onto the recording medium in a random pattern. Using an inkjet print head, the ink composition may be applied in a predetermined pattern.

The ink composition is a radiation-curable ink composition. The radiation-curable ink may comprise a radiation-curable medium. The radiation-curable medium may comprise at least one radiation-curable component. A radiation-curable component is a component that may react (e.g. polymerize) under influence of suitable radiation, such as electromagnetic radiation, e.g. ultraviolet (UV) radiation. Examples of radiation-curable components are epoxides and (meth) acrylates. (Meth-) acrylates may comprise one or more reactive groups for forming an acrylate polymer. The radiation-curable medium may comprise one type of radiation curable compound or alternatively, the radiation-curable medium may comprise a mixture of radiation-curable compounds. The radiation-curable medium may further comprise a solvent, such as water or an organic solvent. The solvent may be added to the radiation curable medium to tune ink properties, such as viscosity.

Further, additional components may be added to the radiation curable medium. For example, the radiation curable medium may comprise one or more surfactants, one or more photo initiators, inhibitors, antibacterial components and anti-fungi components. The radiation curable ink composition may further comprise a colorant, such as a pigment, a dye or a mixture thereof. Further, the radiation curable inkjet ink composition may comprise a mixture of dyes and/or a mixture of pigments. The colorant may provide the ink composition with a predetermined color.

In step b, the first layer is cured. Curing may be done by irradiating the ink layer with a suitable type of radiation. Preferably, the ink composition is irradiated with UV-radiation. The inkjet ink composition may be irradiated using a suitable source of radiation, such as a halogen lamp, a mercury lamp and/or a LED lamp. Optionally, a plurality of sources of radiation may be used to irradiate the inkjet ink composition.

In the method according to the invention, in step c, at least a second layer of radiation-curable ink is applied on top of the first cured layer. Optionally one or more additional layers of ink may be applied on top of the second layer. The layers of ink may be cured before a subsequent layer is applied. Alternatively, a number of layers may be applied on top of one another without curing in between. The at least second layer of ink may be applied using the same ink as is used for applying the first layer of ink. Alternatively, the ink used for applying the second layer of ink may be different from the ink used for applying the first layer of ink. In a further alternative, a first set of ink compositions may be used for applying the first layer of ink and a second ink set may be used for applying the second layer of ink, wherein the inks in the first ink set and the inks in the second ink set partially overlap.

In step a, the ink is applied such that the coverage of the first layer is 1.0 g/m$^2$ or less. Thus, per square meter of the recording medium, an amount of ink of 1.0 grams or less is applied. This is a relatively low amount. The amount of ink applied per unit area may be controlled by suitably controlling the ink applicator(s), for example a spray unit, a roller or an ink jet print head. The inventors have surprisingly found that applying a low amount of ink and curing it before applying further layers of ink improves the adhesion of the printed image on the recording medium.

In an embodiment, the coverage of the first layer is in the range of 0.05 g/m$^2$-1.0 g/m$^2$. Preferably, the coverage of the first layer is in the range of 0.3 g/m$^2$-0.9 g/m$^2$. More preferably, the coverage of the first layer is in the range of 0.4 g/m$^2$-0.8 g/m$^2$.

In an embodiment, the coverage of the at least second is at least 5 g/m$^2$ or more. The at least second layer of ink may applied onto the recording medium may provide the recording medium with visual information. The visual information may comprise text, an image or a combination thereof. Preferably, the coverage of the at least second layer of ink is in the range of 5 g/m$^2$-50 g/m$^2$, more preferably in the range of 10 g/m$^2$-20 g/m$^2$. The coverage of the at least second layer may thus be at least five times the coverage of the first layer.

In an embodiment, a time interval between applying the first layer of ink and curing the first layer is in the range of 3-10 s. By allowing a certain time interval between applying the first layer and curing the first layer, the ink may spread over the recording medium. By leaving at least 3 s after applying the first layer, the ink may spread sufficiently over the recording medium. If curing of the ink takes place within less than 3 s after application of the first layer, the ink may not have spread yet over the recording medium. Without wanting to be bound to any theory, it is believed that spreading of the ink may further improve the adhesion between the ink and the recording medium.

After 10 s, no significant additional spreading of the ink may take place.

In an embodiment, the ink comprises a gelling agent. The gelling agent may provide the ink composition with gelling properties. When applying a gelling ink composition onto the recording medium, the viscosity of the ink may increase after the ink has been applied onto the recording medium. Because of the gelling nature, spreading of the droplets is controlled. Thus, the droplets may not spread, but the droplets may not spread excessively, and thus color bleeding may be prevented. An image having good image quality may thus be obtained even though the ink composition is not cured directly after being applied onto the recording medium.

In an embodiment, the first layer of ink is applied onto the recording medium by applying a first ink from an ink set and wherein the second layer is applied by applying at least the first ink from the ink set. When printing, an ink set using a plurality of different ink compositions may be used. The plurality of ink compositions may differ from one another, for example in color. In printers, often an ink set is used that comprises at least a Cyan ink, a Magenta ink, A Yellow ink and a black ink. Optionally, further ink may be used, such as a white ink, a colorless ink, a grey ink, a light Magenta ink, a light Cyan ink, a red ink, a blue ink, an orange ink and/or a green ink. Using such ink set, a multi-color image can be formed on a recording medium.

The first layer of ink may be applied using a first ink. Preferably, the first ink is an ink having a color that is the same as the color of the recording medium or closely matches the color of the recording medium. The second layer of ink may be applied using a plurality of different inks from the ink set. The first ink may be used to, optionally in combination with other inks from the ink set, to provide an image onto the recording layer In an alternative embodiment, the first layer of ink is applied onto the recording medium by applying a first ink from an ink set and wherein the second layer is applied by applying at least a second ink from the ink set. In the embodiment, the ink used for applying the first layer may be different from using the ink used for applying the second layer. For example, the first ink may be an ink having a recipe configured to provide improved adhesion.

In an embodiment, the first ink is an ink composition comprising a white colorant or wherein the first ink is an ink composition not comprising a colorant. Often, the recording medium is white. In that case, the first ink is preferably a white ink or a colorless ink. When using a white ink or a colorless ink, the first layer is hardly visible on the recording medium, after finishing the print. This is beneficial, as it improves the image quality.

In an embodiment, the first layer of ink is applied by a first ink ejecting unit and the second layer of ink is applied by a second ink ejecting unit, the first ink ejecting unit being positioned upstream, in the direction of medium transport, with respect to the second ink ejecting unit.

By using this configuration of ink ejecting units, the recording medium may be suitably provided with the first layer of ink and the second layer of ink. When the recording medium moves with respect to the ink ejecting units in the direction of medium transport, the first layer is applied onto the recording medium first and the second layer is applied onto the recording medium afterwards.

The ink ejecting units may be print heads. The print heads may be page-wide print head. Alternatively, the print head may have a width smaller than the dimension of the recording medium and may be moved with respect to the recording medium in a scanning direction.

In an embodiment, the ink ejecting units may be spray units, or a combination of one or more spray units and one or more print heads.

In an embodiment, the ink ejecting units may be nozzle groups within an inkjet print head. A first group of nozzles in a print head may be configured to eject ink to form the first layer, whereas a second group of nozzles in the print head may be configured to eject ink to form the second layer. The first group of nozzles may be the first ink ejecting unit and the second group of nozzles may be the second ink ejecting unit.

In an embodiment, the method further comprising the step of:

d. Curing the second layer.

By curing the second layer after applying the second layer, a robust image may be formed. Curing may be done by irradiating the ink layer with a suitable type of radiation. Preferably, the ink composition is irradiated with UV-radiation. The inkjet ink composition may be irradiated using a suitable source of radiation, such as a halogen lamp, a mercury lamp and/or a LED lamp. Optionally, a plurality of sources of radiation may be used to irradiate the inkjet ink composition.

In an aspect of the invention, a software product is provided, the software product comprising program code on a non-transitory machine-readable medium, wherein the program code, when loaded into a controller of a printer with jetting devices for ejecting a radiation-curable ink, causes the controller to perform a method according to the invention.

In a further aspect of the invention, an ink-jet printing apparatus is provided, the ink-jet printing apparatus comprising:

a) a jetting device for ejecting a radiation-curable ink onto a recording medium;

b) a curing unit; and c) a controller configured to control the ink-jet printer to perform a method according to the invention.

The ink-jet printing apparatus is thus configured to perform the method according to the present invention.

BRIEF DESCRIPTION OF THE DRAWINGS

These and further features and advantages of the present invention are explained hereinafter with reference to the accompanying drawings showing non-limiting embodiments and wherein.

In the drawings, same reference numerals refer to same elements.

DETAILED DESCRIPTION OF THE DRAWINGS

Figure 1A:
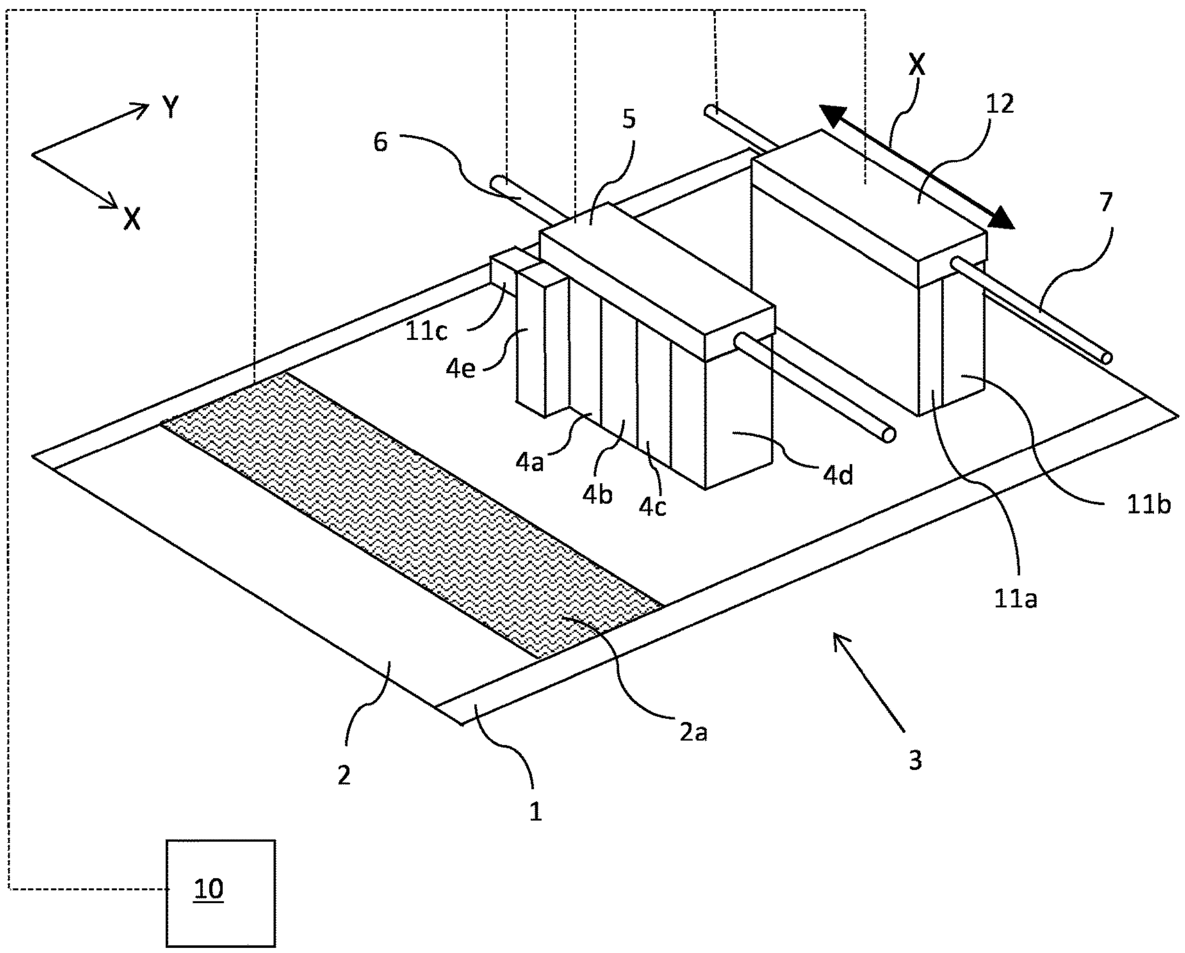
FIG. 1A shows a schematic representation of an inkjet printing system according to a first embodiment of the invention.
Figure 1B:
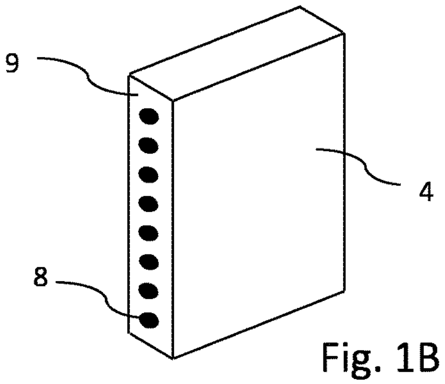
FIG. 1B shows a schematic representation of an inkjet print head.

FIG. 1A shows an ink jet printing assembly 3. The ink jet printing assembly 3 comprises supporting means for supporting an image receiving medium 2. The supporting means are shown in FIG. 1A as a flat surface 1, but alternatively, the supporting means may be a platen, for example a rotatable drum that is rotatable around an axis. The supporting means may be optionally provided with suction holes for holding the image receiving medium in a fixed position with respect to the supporting means. The ink jet printing assembly 3 comprises print heads 4*a*-4*e*, mounted on a scanning print carriage 5. The scanning print carriage 5 is guided by suitable guiding means 6 to move in reciprocation in the main scanning direction X. Each print head 4*a*-4*e* comprises an orifice surface 9, which orifice surface 9 is provided with at least one orifice 8, as is shown in FIG. 1B. The print heads 4*a*-4*e* are configured to eject droplets of marking material onto the image receiving medium 2.

The image receiving medium 2 may be a medium in web or in sheet form and may be composed of e.g. paper, cardboard, label stock, coated paper, plastic or textile. Alternatively, the image receiving medium 2 may also be an intermediate member, endless or not. Examples of endless members, which may be moved cyclically, are a belt or a drum. The image receiving medium 2 is moved in the sub-scanning direction Y over the flat surface 1 along four print heads 4*a*-4*e* provided with a fluid marking material.

The image receiving medium 2, as depicted in FIG. 1A is locally heated or cooled in the temperature control region 2*a*. In the temperature control region 2A, temperature control means (not shown), such as heating and/or cooling means may be provided to control the temperature of the receiving medium 2. Optionally, the temperature control means may be integrated in the supporting means for supporting an image receiving medium 2.

The temperature control means may be electrical temperature control means. The temperature control means may use a cooling and/or heating liquid to control the temperature of the image receiving medium 2. The temperature control means may further comprise a sensor (not shown) for monitoring the temperature of the image receiving medium 2.

A scanning print carriage 5 carries the five print heads 4*a*-4*e* and may be moved in reciprocation in the main scanning direction X parallel to the platen 1, such as to enable scanning of the image receiving medium 2 in the main scanning direction X. Only five print heads 4*a*-4*e* are depicted for demonstrating the invention. In practice an arbitrary number of print heads may be employed. In any case, at least one print head 4*a*-4*e* per color of marking material is placed on the scanning print carriage 5. For example, for a black-and-white printer, at least one print head 4*a*-4*e*, usually containing black marking material is present. Alternatively, a black-and-white printer may comprise a white marking material, which is to be applied on a black image-receiving medium 2. For a full-color printer, containing multiple colors, at least one print head 4*a*-4*e* for each of the colors, usually black, cyan, magenta and yellow and a further color, such as white, is present. Often, in a full-color printer, black marking material is used more frequently in comparison to differently colored marking material. Therefore, more print heads 4*a*-4*e* containing black marking material may be provided on the scanning print carriage 5 compared to print heads 4*a*-4*e* containing marking material in any of the other colors. Alternatively, the print head 4*a*-4*e* containing black marking material may be larger than any of the print heads 4*a*-4*e*, containing a differently colored marking material.

The carriage 5 is guided by guiding means 6. These guiding means 6 may be a rod as depicted in FIG. 1A. Although only one rod 6 is depicted in FIG. 1A, a plurality of rods may be used to guide the carriage 5 carrying the print heads 4. The rod may be driven by suitable driving means (not shown). Alternatively, the carriage 5 may be guided by other guiding means, such as an arm being able to move the carriage 5. Another alternative is to move the image receiving material 2 in the main scanning direction X.

Each print head 4*a*-4*e* comprises an orifice surface 9 having at least one orifice 8, in fluid communication with a pressure chamber containing fluid marking material provided in the print head 4*a*-4*e*. On the orifice surface 9, a number of orifices 8 are arranged in a single linear array parallel to the sub-scanning direction Y, as is shown in FIG. 1B. Alternatively, the nozzles may be arranged in the main scanning direction X. Eight orifices 8 per print head 4*a*-4*e* are depicted in FIG. 1B, however obviously in a practical embodiment several hundreds of orifices 8 may be provided per print head 4*a*-4*e*, optionally arranged in multiple arrays.

As depicted in FIG. 1A, four print heads 4*a*-4*d* are placed parallel to each other. The four print heads 4*a*-4*d* are print heads configured to eject a colored ink during printing operation, for example, a cyan ink, a magenta ink, a yellow ink and a black ink. The print heads 4*a*-4*d* may be placed such that corresponding orifices 8 of the respective print heads 4*a*-4*d* are positioned in-line in the main scanning direction X. This means that a line of image dots in the main scanning direction X may be formed by selectively activating up to four orifices 8, each of them being part of a different print head 4*a*-4*d*. This parallel positioning of the print heads 4*a*-4*d* with corresponding in-line placement of the orifices 8 is advantageous to increase productivity and/or improve print quality. Alternatively multiple print heads 4*a*-4*d* may be placed on the print carriage adjacent to each other such that the orifices 8 of the respective print heads 4*a*-4*d* are positioned in a staggered configuration instead of in-line. For instance, this may be done to increase the print resolution or to enlarge the effective print area, which may be addressed in a single scan in the main scanning direction X. The image dots are formed by ejecting droplets of marking material from the orifices 8. Further, a fifth print head 4*e* is provided. This fifth print head 4*e* is positioned upstream in the sub scanning direction Y with regard to the other print heads 4*a*-4*d*. The fifth print head 4*e* may be configured to apply the first layer of ink onto the recording medium before the second layer is applied onto the recording medium.

In an alternative embodiment (not shown), the print heads 4*a*-4*e* may be placed in parallel. In this embodiment, the activator composition and the ink composition may be applied onto the image receiving material 2.

The print head carriage 5 is provided with a curing lamp 11*c* for curing the first layer of ink before the second layer of ink is applied. In the embodiment shown in FIG. 1, a separate curing lamp is provided. However, in an alternative embodiment (not shown), no curing lamp may be provided adjacent to the fifth print head 4*e* and the radiation may be provided in an alternative way. For example, a mirror may be provided that is configured to in operation reflect radiation emitted by curing means 11*a*, 11*b*.

The ink jet printing assembly 3 may further comprise curing means 11*a*, 11*b*. As shown in FIG. 1A, a scanning print carriage 12 carries the two curing means 11*a*, 11*b* and may be moved in reciprocation in the main scanning direction X parallel to the platen 1, such as to enable scanning of the image receiving medium 2 in the main scanning direction X. Alternatively, more than two curing means may be applied. It is also possible to apply page-wide curing means. If page-wide curing means are provided, then it may not be necessary to move the curing means in reciprocation in the main scanning direction X. The first curing means 11*a* may emit a first beam of UV radiation, the first beam having a first intensity. The first curing means 11*a* may be configured to provide the radiation for the pre-curing step. The second curing means 11*b* may emit a second beam of radiation, the second beam of radiation having a second intensity. The second curing means 11*b* may be configured to provide the radiation for the post-curing step.

The carriage 12 is guided by guiding means 7. These guiding means 7 may be a rod as depicted in FIG. 1A. Although only one rod 7 is depicted in FIG. 1A, a plurality of rods may be used to guide the carriage 12 carrying the print heads 11. The rod 7 may be driven by suitable driving means (not shown). Alternatively, the carriage 12 may be guided by other guiding means, such as an arm being able to move the carriage 12.

The curing means may be energy sources, such as actinic radiation sources, accelerated particle sources or heaters. Examples of actinic radiation sources are UV radiation sources or visible light sources. UV radiation sources are preferred, because they are particularly suited to cure UV curable inks by inducing a polymerization reaction in such inks. Examples of suitable sources of such radiation are lamps, such as mercury lamps, xenon lamps, carbon arc lamps, tungsten filaments lamps, light emitting diodes (LED's) and lasers. In the embodiment shown in FIG. 1A, the first curing means 11*a* and the second curing means 11*b* are positioned parallel to one another in the sub scanning direction Y. The first curing means 11*a* and the second curing means 11*b* may be the same type of energy source or may be different type of energy source. For example, when the first and second curing means 11*a*, 11*b*, respectively both emit actinic radiation, the wavelength of the radiated emitted by the two respective curing means 11*a*, 11*b* may differ or may be the same. The first and second curing means are depicted as distinct devices. However, alternatively, only one source of UV radiation emitting a spectrum of radiation may be used, together with at least two distinct filters. Each filter may absorb a part of the spectrum, thereby providing two beams of radiation, each one having intensity different from the other.

The flat surface 1, the temperature control means, the carriage 5, the print heads 4*a*-4*d*, the carriage 12 and the first and second curing means 11*a*, 11*b* are controlled by suitable controlling means 10.

Figure 1C:
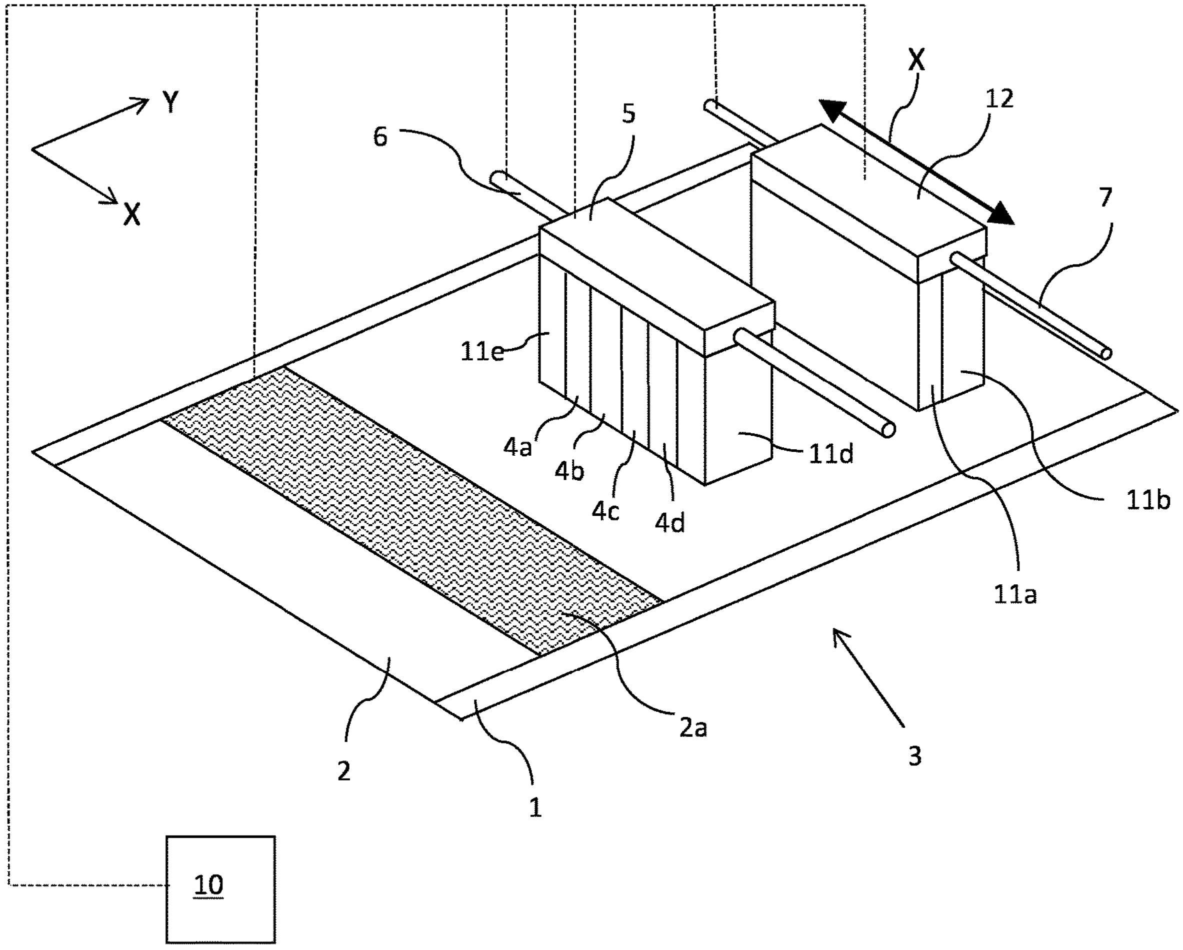
FIG. 1C shows a schematic representation of an inkjet printing system according to a second embodiment of the invention.

FIG. 1C shows an ink jet printing assembly 3 similar to the inkjet assembly shown in FIG. 1A. The ink jet printing assembly comprises four print heads 4*a*-4*d* that are placed parallel to each other. The four print heads 4*a*-4*d* are print heads configured to eject a colored ink during printing operation, for example, a cyan ink, a magenta ink, a yellow ink and a black ink. The print head carriage 5 is further provided with two first curing lamps 11*d*, 11*e*. The first curing lamps are placed adjacent to the print heads 4*a*-4*e*. In printing operation, the print head carriage 5 moves in reciprocation in scanning direction X and ink deposited by the print heads may be cured before a subsequent layer of ink is deposited.

The first curing lamps may optionally comprise a plurality of individual controllable radiation emitting elements. The power of the radiation emitting elements may be individually controlled, thereby controlling the intensity and optionally wavelength of the radiation emitted by the individual radiation emitting elements.

The nozzles 8 of the print heads 4*a*-4*d* may be divided in subsections. At least one of the print heads 4*a*-4*d* may comprise at least two subsections of nozzles 8. A first subsection may be positioned upstream in the media transport direction Y with respect to the second subsections of nozzles. The first subsection of nozzles may be configured to in printing operation apply the first layer of ink onto the recording medium. The second subsection of nozzles may be configured to in printing operation apply the second layer of ink and optionally further layers of ink onto the recording medium. The individual radiation emitting units may be controlled such that the first layer of ink applied onto the recording medium may be irradiated differently than the second layer. The subsequent layer of ink may not be irradiated with radiation by the first curing elements 11*d*, 11*e*. Alternatively, the second and optionally subsequent layer of ink may be irradiated with a smaller dose of radiation ("pinned") than the first layer of ink by the first curing elements 11*d*, 11*e*.

EXPERIMENTS AND EXAMPLES

Materials

UVgel 460 inks-commercially available for use with the Colorado 1650 printer-were obtained from Canon. The chemicals were used as received. As recording medium, Lexan™ was used. Lexan™ is a polycarbonate rigid material and was obtained from Sabic.

Methods

Printing

Prints were made using a Canon Colorado 1650 printer. The Colorado 1650 printer was operated in the glossy mode, unless stated otherwise.

Adhesion Measurements

Adhesion was tested using a crosshatch test according to ASTM D3359. The tested samples were allocated a number in the range 0-5, wherein 0 corresponds to bad adhesion and 5 corresponds to excellent adhesion.

Comparison Experiments

Examples and Comparative Examples

Printing Example 1

A square of black ink having a size of 10 cm×10 cm was printed by applying 0.5 g/m$^2$ of yellow ink onto the recording medium as a first layer. The first layer was cured before applying additional layers on top of the first layer.

After curing the first layer, the recording medium was moved in the reverse medium transport direction until the cured first layer and a second layer was applied onto the cured first layer by applying a square of black ink, having a size of 10 cm×10 cm by applying 22 g/m$^2$ of black ink onto the recording medium. The ink was cured afterwards, resulting in printing example Ex1. The adhesion of printing example Ex 1 was determined.

Printing Example 2

Printing example 2 was prepared and analyzed similarly to printing example 1 (Ex1), but the second layer was applied by applying 17 g/m$^2$ onto the recording medium. The printing example 2 is referred to as example Ex2.

Comparative Printing Example 1

A square of black ink, having a size of 10 cm×10 cm was printed by applying 22 g/m$^2$ of black ink onto the recording medium. The ink was cured afterwards, resulting in comparative printing example CE1.

The adhesion of comparative printing example CE1 was determined.

Comparative Printing Example 2

Comparative printing example 2 was prepared and analyzed similarly to comparative printing example 1 (CE1), only 17 g/m$^2$ of ink, instead of 22 g/m$^2$ of ink, was applied onto the recording medium. The printing example 2 is referred to as example CE2.

TABLE 1 comparison printing experiments

| Printing Experiments | Adhesion |
|---|---|
| Printing Example Ex1 | 5 |
| Printing Example Ex2 | 5 |
| Comparative Printing Example CE1 | 1 |
| Comparative Printing Example CE2 | 2 |

Printing examples Ex1 and Ex2, which are printing examples according to the present invention, show excellent adhesion. The adhesion of comparative printing examples CE1 and CE2, which are printing examples not according to the present invention, show poor adhesion.

From the experimental data, it can be concluded that the adhesion was improved by printing and curing a first layer having a coverage of 0.5 g/m$^2$, before applying further layers of ink.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention claimed is:

1. A method for applying an image onto a recording medium, the method comprising the steps of:

a) applying a first layer of a radiation-curable ink onto a recording medium;

b) curing the first layer;

c) applying at least a second layer of radiation-curable ink on top of the first cured layer, wherein a coverage of the first layer applied on the recording medium is 1.0 g/m$^2$ or less, and wherein the first layer of ink is applied onto the recording medium by applying a first ink from an ink set and wherein the second layer is applied by applying at least the first ink from the ink set.

2. The method for applying an image onto a recording medium according to claim 1, wherein a time interval between applying the first layer of ink and curing the first layer of ink is in the range of 3-10 s.

3. The method for applying an image onto a recording medium according to claim 1, wherein the ink comprises a gelling agent.

4. The method for applying an image onto a recording medium according to claim 1, wherein the second layer is applied by applying at least a second ink from the ink set.

5. The method for applying an image onto a recording medium according to claim 1, wherein the first ink is an ink composition comprising a white colorant or wherein the first ink is an ink composition not comprising a colorant.

6. The method for applying an image onto a recording medium according to claim 1, wherein the first layer of ink is applied by a first ink ejecting unit and the second layer of ink is applied by a second ink ejecting unit, the first ink ejecting unit being positioned upstream, in the direction of medium transport, with respect to the second ink ejecting unit.

7. The method for applying an image onto a recording medium according to claim 1, the method further comprising the step of:

d. curing the second layer.

8. A software product comprising program code on a non-transitory machine-readable medium, wherein the program code, when loaded into a controller of a printer with jetting devices for ejecting a radiation-curable ink, causes the controller to perform a method according to claim 1.

9. An ink-jet printing apparatus, the ink-jet printing apparatus comprising:

a) a jetting device for ejecting a radiation-curable ink onto a recording medium;

b) a curing unit; and c) a controller configured to control the ink-jet printer to perform a method according to claim 1.

* * * * *